May 12, 1931.  J. LEDWINKA  1,804,794

DOOR FOR CLOSED VEHICLE BODIES

Filed Nov. 3, 1927  2 Sheets-Sheet 1

INVENTOR:
Joseph Ledwinka,
BY
ATTORNEY.

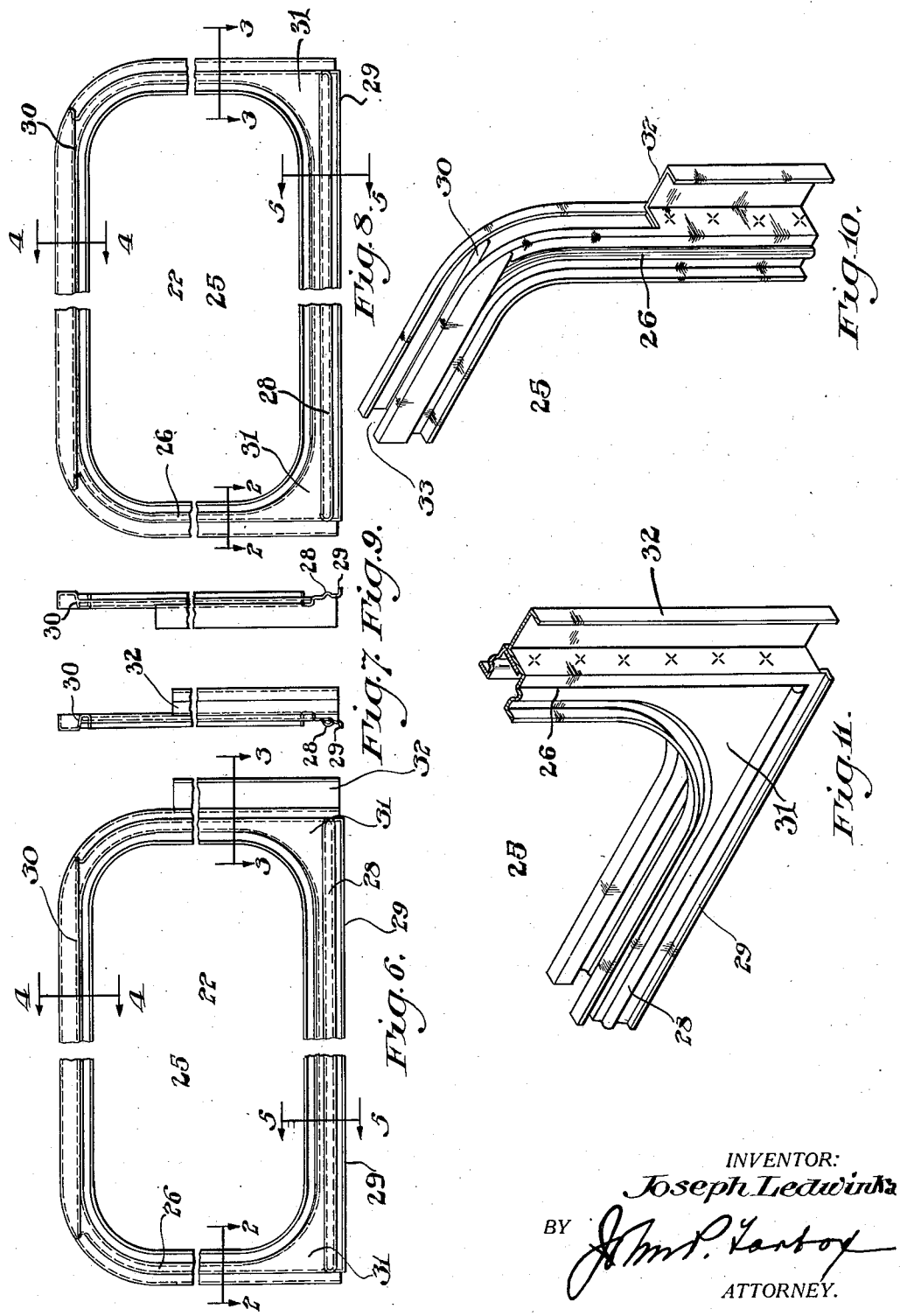

Patented May 12, 1931

1,804,794

UNITED STATES PATENT OFFICE

JOSEPH LEDWINKA, OF PHILADELPHIA, PENNSYLVANIA, ASSIGNOR TO EDWARD G. BUDD MANUFACTURING CO., OF PHILADELPHIA, PENNSYLVANIA, A CORPORATION OF PENNSYLVANIA

DOOR FOR CLOSED VEHICLE BODIES

Application filed November 3, 1927. Serial No. 230,703.

My invention is an improvement upon the door, the subject of my application Serial No. 159,829, filed January 8, 1927. In that application I describe the door, the principal elements of which are a one piece inner panel, a one piece outer panel having a window opening formed therein together with a glass run channel structure in the form of a closed polygonal figure in its length surrounding said window opening and connected in its margins thereto. This glass run channel as disclosed in that application is comprised of a number of members of angle, channel and plane form, which members were separately formed and welded together to constitute the complete frame. The welding of the members of the glass run channel was preferably accomplished to make the closed polygonal figure of the form of the window opening before assembly with the panel members. It was, however, feasible to effect the assembly at the time of first assembly of the channel per se with the panel members per se. In either event, however, jigging and joining operations, several in number and of more or less extent and complexity, were necessary in order to have the parts fit accurately together and to effectively join them, especially by the crimping operations which were used, and furthermore, to prevent undue warping incident to the joining together of the parts of the channel by welding. Each separately made part, each jigging operation and each joinder introduces its own error, with the result that it was found unduly difficult to obtain perfect fits and dimensions of the window opening and the glass run channel and that the cost of the product was unduly increased.

The outstanding object of my present invention is to obviate all of these difficulties, to actually improve the product over the best that could be done by the old construction and to reduce the cost.

This object I attain primarily by forming the closed polygonal figure of the length of the glass run channel as a one piece stamping, whereby it is rendered dimensionally perfect by the dies themselves, whereby the number of jigging and joining operations is reduced to a veritable minimum. Forms of the stampings themselves I simplify and strengthen to a large extent by an effective coordination of the cross sections of the channel parts and the cross sections of the panel stampings of the door.

Referring now to the drawings,

Figures 6 and 7 are respectively vertical, side and end elevations of one of a pair of complemental window channel stampings used in this embodiment and/or shown in cross section in the preceding sections.

Figures 8 and 9 are similar views of the other stamping of the pair.

Figure 10 is a three quarter perspective of the upper right corner of the stamping of Figs. 6 and 7.

Figure 11 is a three quarter perspective of the lower corner of the assembled stampings of Figs. 6 to 9.

Figure 1:
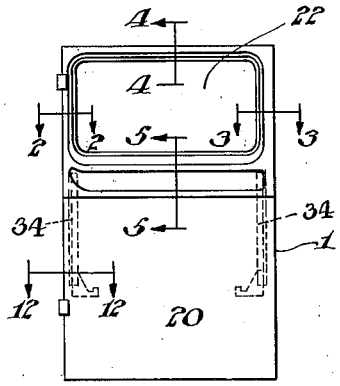
Figure 1 shows in vertical side elevation the outline of the door in which my invention has been embodied.
Figure 3:
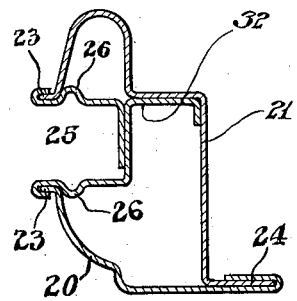
Figure 3 is a similar cross section of the right rail on line 3—3.
Figure 2:
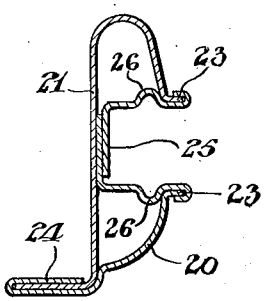
Figure 2 is the cross section of the left rail of this door on the line 2—2.
Figure 4:
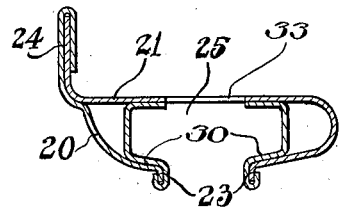
Figure 4 is a cross section of the top rail upon line 4—4.

20 is the outer panel of the door, 21 the inner panel. Both are one piece stampings for the entire area of the door as in my earlier application referred to. In the upper portions of these stampings there is formed a window opening 22. The panel stampings 20—21 in the margins of the window opening are approached toward each other as clearly appears in the Figures 2 to 5 and are provided with narrow flanges 23 extending out into the window opening and substantially parallel to the window itself.

The panels 20 and 21 are connected in their margins by a crimped joint 24 as is usual in door practice. In the margins of the window opening 22, however, they are connected together by the glass run channel structure designated at large as by the numeral 25.

Figure 5:
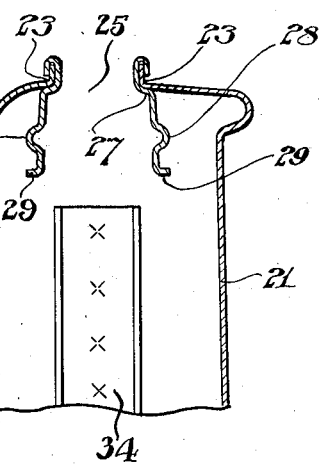
Figure 5 is a cross section of the window sill on line 5—5.

This glass run channel is formed of two complemental stampings shown in general in Figs. 6 to 8 and in cross section in Figs. 2 to 5. For the purpose of readily applying the cross section the same cross section lines appearing in Fig. 1 are repeated in connection with Figs. 6 and 8 with the understanding that the showing in Fig. 5 is comprehensive. Each such member, as aforesaid, is a one piece integral stamping of sheet metal and polygonal, in this case rectangular, in its length. Each stamping is of angle form on its two opposite sides, of channel form on its top and in general of relatively plane form on its bottom as appears respectively in Figs. 2, 3, 4 and 5. The angles of the sides present inwardly of the window opening 22. On the branch of the angle parallel to the plane of the window opening there is a provided strengthening and crimping bead 26. On the bottoms there is provided a corresponding offset 27. In addition the bottoms contain a strengthening bead 28 and an outturned strengthening flange 29. At the top the inner side wall 30 of the channel cross section takes the place of bead 26 and offset 27. These crimping and strengthening beads and offsets 26—27 and 30 are merged into each other as clearly appears in Figs. 6 to 8 to form a practically continuous strengthening formation. At the lower corners this formation is expanded in area to form strengthening cornices 31. On one side of one of these complemental stampings, that shown in Fig. 6 in this instance, is integrally formed an angle shaped lateral extension 32.

Either before or during the assembly with the panel stampings 20 and 21, preferably in assembly in connection with the inner panel 21 and before final assembly, the complemental members are assembled together as clearly appears in Figs. 2 to 5 and 11. The one stamping, that of Fig. 8, is of a dimension enabling it to be nested within the other, that of Fig. 6, the angle of the side portions presenting toward each other. They are secured to each other by welding together the overlapped branches of their angular cross sections as clearly appears in Fig. 11. On the one side, that of the section of Fig. 2, they are also welded to the main body of the inner panel 21, this main body constituting the jamb face of the door. On the opposite side the panel 21 is offset as appears in Fig. 3 and securement to that panel is by welding the angular extension 32 into the angular offset of panel 21. This offset is the rabbet of the door. At the top the upper side walls of the channel cross section are welded to opposite sides of the aperture 33 through which the window is inserted. All around the margins of the channel structure so formed, the side walls of the channel are crimped to the crimping flanges 23 of the channels, the crimping being outwardly over those flanges. The beads 26, the offsets 27, and the channel side walls 30, respectively coact with other elements of the crimped joint to make the same firm, tight and secure.

Figure 12:
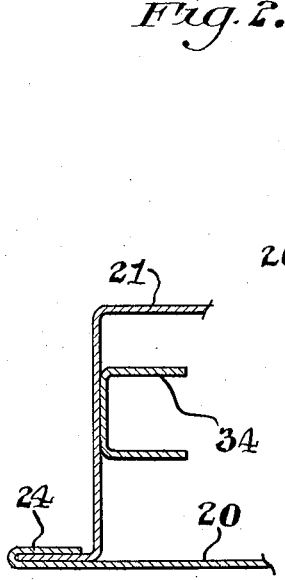
Figure 12 is a cross section on line 12—12 of Figure 1.

In the lower part of the door, shown in section in Fig. 12, on each side thereof the channel is continued below the lower bodies of panels 21—22 by separately formed and secured sections of channel shaped stampings 34, which stampings are welded in place in alignment with the channels 25.

That I have attained in full the objects of my invention is believed to be self-apparent. I have succeeded in forming the glass run channel of but two principal stampings. Not only has this reduced to a minimum the number of parts necessary, the handling of those parts, the jigging and joining, but also it has vastly increased the general accuracy and quality of the product, greatly reduced the cost, and in addition, produced a door which in point of strength, appearance and general durability is superior to doors heretofore produced.

Those modifications of which my invention is susceptible without departing from its generic spirit should likewise be comprehended by the enclosed claims.

What I claim as new and useful is:

1. In an automobile door, a one piece window frame stamping in which is made the window opening together with a one piece glass run channel stamping embracing said opening and connected to the frame stamping.

2. In an automobile door, comprising a frame stamping in which is formed a window opening together with a one piece glass run channel stamping embracing said window opening and connected with the frame stamping.

3. In an automobile door, a one piece window frame stamping in which the window opening is formed together with a one piece glass run channel stamping extending entirely around said window and connected to the window frame.

4. In an automobile door, a one piece window frame stamping in which the window opening is formed together with a one piece glass run channel stamping extending entirely around said window and connected to the window frame and having a crimped connection with the window frame stamping throughout the edge of the window opening.

5. In an automobile door having a window opening therein and comprised of inner and outer sheet metal stampings, the margins of which in the window opening are approached toward each other and a glass run channel therefor comprising angle shaped stampings presenting toward each other and connected together by one branch but respectively connected to the inner and outer approached edges of the panel stampings through the intermediary of their other branches.

6. In an automobile door having a window opening therein and comprised of inner and outer sheet metal stampings, the margins of which in the window opening are approached toward each other and a glass run channel therefor comprising angle shaped stampings presenting toward each other and connected together by one branch but respectively connected to the inner and outer approached edges of the panel stampings through the intermediary of their other branches, and one of said panel stampings having a main body connected with the bottom of said glass run channel.

7. In an automobile door having a window opening therein and comprised of inner and outer sheet metal stampings, the margins of which in the window opening are approached toward each other and a glass run channel therefor comprising angle shaped stampings presenting toward each other and connected together by one branch but respectively connected to the inner and outer approached edges of the panel stampings through the intermediary of their other branches, one of said panel stampings having an angular main body, and an angular extension from the glass run channel seated in and secured to the said angular body whereby the bottom of said glass run channel is connected with but spaced from said angular main body.

8. As an article of manufacture, a glass run channel formed of complemental integral stampings rigidly secured together, each forming an integral closed polygonal figure in its length.

9. As an article of manufacture, a glass run channel stamping extending around a window opening and having sides of angular cross section and tops of channel cross section.

10. As an article of manufacture, a glass run channel in the form of a one piece stamping of polygonal configuration having portions of angle cross section and portions of channel cross section.

11. As an article of manufacture, a glass run channel in the form of a one piece stamping of polygonal configuration having portions of angle cross section and portions of channel cross section and yet other portions of substantially plane form.

12. As an article of manufacture, a glass run channel of closed rectangular form in its length and comprised of a one piece stamping the sides of which are of angle cross section, the top of which is of channel cross section and the bottom of which is generally of plane form.

13. As an article of manufacture, a glass run channel of closed polygonal form in its length and comprised of a one piece metal stamping having laterally projecting portions through which it may be connected to and spaced from the window frame.

14. As an article of manufacture, a glass run channel formed of complemental integral stampings each forming a closed polygonal figure and having angular side portions joined together through transversely extending portions forming the bottom of the glass run.

In testimony whereof I hereunto affix my signature.

JOSEPH LEDWINKA.